Nov. 7, 1961 J. J. WILTING ET AL 3,008,068
TRANSISTOR VOLTAGE CONVERTER
Filed July 24, 1959 3 Sheets-Sheet 1

INVENTORS
JOHANNES JACOBUS WILTING
THEODORUS HEHENKAMP
BY
*Frank R. Trifari*
AGENT INVENTORS
Johannes Jacobus Wilting
Theodorus Hehenkamp
BY
AGENT Nov. 7, 1961   J. J. WILTING ET AL   3,008,068
TRANSISTOR VOLTAGE CONVERTER
Filed July 24, 1959   3 Sheets-Sheet 3

INVENTORS
Johannes Jacobus Wilting
Theodorus Hehenkamp
BY
Frank R. Trifari
AGENT 3,008,068
TRANSISTOR VOLTAGE CONVERTER
Johannes Jacobus Wilting and Theodorus Hehenkamp, Eindhoven, Netherlands, assignors to North American Philips Company, Inc., New York, N.Y., a corporation of Delaware
Filed July 24, 1959, Ser. No. 829,273
Claims priority, application Germany July 26, 1958
13 Claims. (Cl. 315—206)

The invention relates to a voltage converter comprising two push-pull connected, alternately conductive transistors and a winding, provided with a central tapping and connected between the collector electrodes of these transistors, the base- and collector-electrodes of the two transistors being cross-coupled.

Such voltage converters are known. They exhibit, as a rule, an excellent useful effect due to the fact that each transistor is alternately strongly conductive and cut off, so that substantially the full voltage of the supply source is alternately effective over one half and over the other half of the collector winding and no direct-current magnetisation of the ferromagnetic core of the winding takes place, so that the magnetic losses are low. In order to produce higher transformed powers, use is made of high-power transistors. However, the maximum permissible collector voltage, even of such transistors, is comparatively low and also their limit frequency (i.e. the frequency at which the collector-base current amplification factor is 3 db lower, due mainly to the collector capacity), is low.

In order to avoid excess voltages at the collector of the transistor, the voltage peaks occurring across the winding when one transistor becomes conductive and the other transistor is cut off must remain comparatively low. This requirement is the more important the more closely the operating voltage approaches the maximum permissible collector voltage. With a strongly varying load impedance this requirement can often be difficult to fulfill.

A high operating frequency is advantageous with respect to the dimensions and weight of the winding, to the magnetic losses in the core, which operates further below the saturation region at high operating frequencies, and to the coupling- and smoothing-capacitors, which can be chosen smaller. Moreover, it is usually desired that the converter operate noiselessly. With high-power converters this requirement implies that the frequency at which the ferromagnetic core vibrates mechanically owing to any magnetostriction effects, should lie substantially out of, and of course beyond the range of audible frequencies.

The present invention has for its object to provide a transistor voltage converter which substantially fulfills the aforesaid requirements and is particularly suitable for feeding a strong varying load impedance of the inductive type, for example, a luminescent tube and a control-inductor connected in series therewith. The voltage converter according to the invention is characterized in that, a capacitor forms an oscillating circuit together with the inductance effective in the collector-circuits of the transistors, the natural frequency of the oscillating circuit principally determining the operating frequency of the converter; this frequency is at least of the same order as the $\alpha'$-limit frequency of the transistors. Further in accordance with the invention, an R.C. member is connected in the base-emitter circuit of each of the transistors, the impedance of the capacitor of said member at the operating frequency being lower than the value of the resistor; this allows the base current of each of the transistors to lead with respect to its collector current, said collector current being maintained after the blocking of the base-emitter path of the transistor concerned, due to an accumulation of free charge carriers in the base zone of said transistor; the collector current is interrupted prior to the reversal of the collector voltage of the transistor, by a reverse current pulse supplied to the base electrode of said transistor via the capacitor of the R.C. members.

It is thus possible to construct a voltage converter of considerable output power (for example 20 w.), which, in the absence of a load, supplies a much higher voltage than at the normal load; this is necessary, for example, for igniting a luminescent tube without exceeding the maximum permissible collector voltage, this converter also operating substantially noiselessly in spite of the low limit frequency of the employed high-power transistors.

A further advantage of the converter according to the present invention is due to the fact that the effective inductance of the collector winding and hence the operating frequency of the converter are affected by the load and that the voltage occurring across the collector winding is substantially sinusoidal: the lagging collector current component produced by an inductive load is automatically compensated, so that the amplitude of the output voltage produced can be raised at will by step-up transformation without increasing the transistor losses; this is an effect which cannot be obtained in the case of a square-wave voltage. This property is particularly important for the ignition of a luminescent tube fed by the converter.

The invention will now be described more fully with reference to the drawing, in which FIG. 1 shows the circuit diagram of a known transistor voltage converter of the type referred to above, FIG. 2 shows voltage- and current-time diagrams of a known converter of the said type, FIG. 3 shows the circuit diagram of a first embodiment of the converter according to the invention, FIG. 4 shows the corresponding diagrams of this converter, FIG. 5 shows a modification of the collector circuit of the transistors of the first embodiment.

Figure 1:
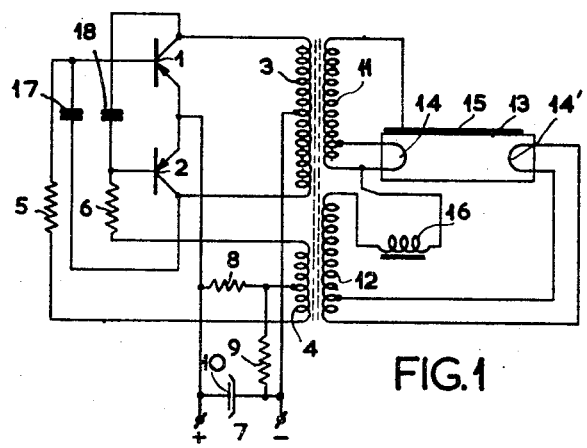

FIG. 1 shows the circuit diagram of a known voltage converter comprising two push-pull connected, alternately conductive transistors 1 and 2 and a winding 3, provided with a central tapping and arranged between the collector electrodes of these transistors. For the self-excitation of the relaxation oscillations of the transistors 1 and 2 provision is made of a feed-back winding 4. This winding also has a tapping and its ends are connected, via series resistors 5 and 6 of, for example, 5 ohms each, to the base electrodes of the transistors 1 and 2. The central tapping of the collector winding 3 is connected to the negative terminal of a supply source 7; the emitter electrodes of the two transistors are connected to the positive terminal of this source and the central tapping of the winding 4 is connected to the tapping of a potentiometer consisting of resistors 8 and 9 of, for example, 10 and 560 ohms respectively, connected to the terminals of the source 7. This source is shunted by a capacitor 10 of, for example, 100 µf.

The collector winding 3, the feed-back winding 4 and secondary windings 11 and 12 are arranged on a common core of ferromagnetic material, for example ferrite. The converter may serve to feed a luminescent tube 13. A small portion of the winding 11 feeds one of the filaments 14 of this tube, whereas the other filament 14' is fed from a small portion of the secondary winding 12. The operating voltage for maintaining and igniting the discharge in the luminescent tube is produced across the whole of the secondary winding 12, and the whole of the winding 11 applies a still higher voltage between the filament 14 and a metal-coated strip 15 of the luminescent tube. In a known manner, this voltage serves to facilitate the ignition of the luminescent tube. The operating and ignition voltages of the winding 12 are applied via a variable inductor 16, for example a choke wound on a ferromagnetic core, between the filaments 14 and 14'.

The luminescent tube 13, connected in series with the choke 16, constitutes a load impedance of inductive type. Therefore, the current through winding 3 lags in time with respect to the voltage across this winding. This is evident from the current and voltage diagrams of FIG. 2. With the voltage converters hitherto known, particularly with push-pull voltage converters, it was endeavoured to obtain a maximum steepness of the leading and trailing edges of the voltage pulses produced. To this end the natural frequency of the loaded collector winding was chosen to be comparatively high, whereas a much lower operating frequency was obtained owing to the time constant $L/R$, which controls the increase in collector current of each transistor up to the saturation value. The high-frequency oscillations at the natural frequency of the loaded collector winding with its parasitic capacities were strongly damped by the load, so that, each time, only a short peak was obtained at the change-over by means of the transistors 1 and 2. This short peak is clearly seen on the voltage-time diagram $V_{c1}$ of FIG. 2. This diagram represents the voltage at the collector of the transistor 1; the corresponding base current $(I_{b1})$- and collector current $(I_{c1})$-time diagrams also exhibit corresponding, short peaks.

In order to improve the cutting-off of each of the transistors 1 and 2 at the end of their respective conduction periods, use is made not only of the inductive feed-back by means of the winding 4 and resistors 5 and 6, as described hereabove, but also, a voltage peak of higher amplitude is fed to the base electrodes of the transistors 1 and 2 via the capacitors 17 and 18 of, for example, 0.25 μf. each. This additional feed-back is particularly operative in the reverse direction, since the voltage pulses supplied in the forward direction via the capacitors are strongly damped by the comparatively low base-emitter impedance. The reverse voltage pulses, however, are very effective for accelerating the cutting-off of the conductive transistor. This is evident from the $I_{b1}$- and $I_{c1}$-time diagrams of FIG. 2.

The arrangement described above was capable of feeding a 20 w. luminescent tube. The transistors 1 and 2 were of the type OC16; the voltage of the supply source was 12.5 v. and the current taken was 2.1 a. The useful effect of the voltage converter was 67%, so that it supplied a power of 17 w. at a voltage of 130 v. across the terminals of the winding 12 and to the luminescent tube. The losses in each of the transistors were 2.9 w. and the peak value of the collector current of each transistor was 3.5 to 4 a. The peak value of the base current of each transistor was approximately equal to 1 a. in loaded condition, and higher than 1 a. in unloaded condition. The operational frequency was about 4.5 kc./s., so that the converter did not operate noiselessly, but produced a disagreeable, very high note.

The aforesaid values of the collector and base currents exceed materially the published maximum allowable values for the transistors of type OC16, so that, after some time, the voltage converter did not operate satisfactorily for the purpose considered. Moreover, with the mode of operation described, the operating frequency could not be increased further, since it was already near the limit frequency (about 5.7 kc./s.) of the transistors employed, so that the frequency of the oscillations produced by the magnetic core could not be raised beyond the range of audible frequencies. When feeding an inductive load, for example, a luminescent tube in series with a control-inductor, the voltage peaks produced at the change-over are amplified owing to the fact that the collector current lags in time with respect to the collector voltage: the current reaches its maximum value at the instant of change-over.

Figure 2:
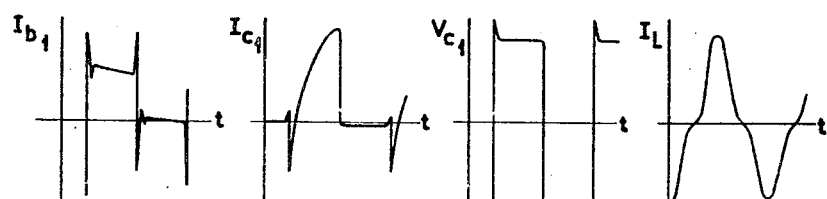
Figure 3:
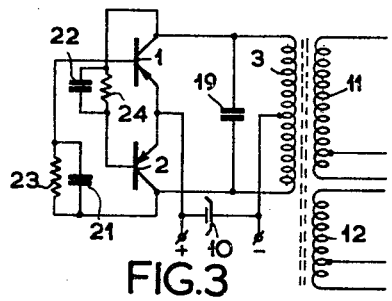

FIG. 3 shows the circuit diagram of a voltage converter according to the invention. With respect to the arrangement this converter differs from that shown in FIG. 1 mainly by the capacitor 19, connected between the collector electrodes of the transistors 1 and 2. It has indeed already been proposed to employ an inductive feed-back applied by way of a resistor and to shunt this resistor by a capacitor, so that an additional capacitative feed-back is obtained. On the other hand, it is also known that with a push-pull converter, the inductive feed-back can be obtained by coupling the base and collector electrodes of the push-pull transistors in a crosswise manner. According to the invention, however, the capacitor 19 together with the winding 3 of FIG. 3 constitutes an oscillating circuit, the natural frequency of which determines the operating frequency of the converter. This natural frequency is chosen to be higher than the $\alpha'$-limit frequency of the transistors employed, i.e. higher than the limit frequency of the collector-base current amplification factor thereof. It is thus much easier to increase the frequency of the mechanical vibrations of the core in the windings 3 beyond the range of the audible frequencies. The operating frequency is then, however, restricted by the accumulation of free charge carriers in the base zone of each transistor. Consequently, at the end of each conduction period, the collector current of each transistor decreases only rather slowly, so that the square-wave voltage pulses of the waveform shown in the $V_{c1}$-diagram of FIG. 2 are no longer obtained. In order to reduce the transistor losses it is, however, desirable that the collector current of each transistor should become equal to zero prior to the change-over of the voltage at the terminals of the collector circuit 3—19. In accordance with the invention, this is achieved by using a principally capacitative feedback. To this end, the time constant of each of the coupling members comprising each a capacitor 21, 22 respectively and a parallel-connected resistor 23, 24 respectively, must be higher than the operating period of the converter. Moreover, the impedance of the capacitor 21 or 22 of each of the coupling members at this operating frequency must be at least an order of magnitude lower than the value of the corresponding resistor 23 or 24. With this proportioning of the coupling members, the base current of each of the transistors leads in time with respect to its collector current. The collector current, which is maintained after the base-emitter path concerned has been blocked owing to the accumulation of free charge carriers in the base zone of the transistor, is interrupted by a reverse current pulse fed to the base electrode via the capacitor 21, 22 respectively, prior to the change-over of the voltage effective at the collector concerned.

Since the time constant of each of the coupling members 21, 23 and 22, 24 respectively of the voltage converter shown in FIG. 3 exceeds the operating period of the converter, the capacitor 21, 22 respectively is still charged in the reverse direction at the end of the blocking period of the transistor 1 or 2 respectively. This charging voltage constitutes a threshold voltage for the feed-back from the collector of the other transistor. Due to the presence of this threshold voltage, the collector current of each of the transistors can only start flowing after the beginning of the forward pulse fed to its base. This delay of the start of the collector current is favourable, as regards the losses in the transistors.

Figure 4:
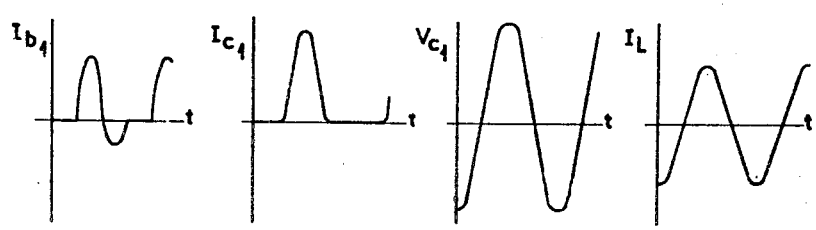

With a practical embodiment comprising two transistors of the type OC16 and the transformer used with the arrangement shown in FIG. 1, the winding 4 of which had, however, been removed, the capacitor 19 had a value of 0.7 μf., the capacitors 21 and 22 were each 0.6 μf. and the resistors 23 and 24 had a value of 300 ohm each. The time constant of each of the coupling members was therefore equal to 180 μsec. The operating frequency was 7.6 kc./s., so that the operating period of the converter (132 μsec), was shorter than the said time constant. The impedance of the capacitors 21 and 22 at an operating frequency of 7.6 kc./s. was 17.5 ohms and thus about 17 times smaller than the resistance of each of the resistors 23 and 24. FIG. 4 shows in the same manner as FIG. 2 for the known circuit arrangement, the mode of operation of the converter according to the invention. It appears that the collector current $I_{c1}$ is initiated by a comparatively strong, semi-sinusoidal forward base-current peak $I_{b1}$. Long before the collector current $I_{c1}$ becomes zero, the base-emitter path is re-blocked, to the extent that even a small reverse current peak flows through this path. This reverse current peak is produced by the free charge carriers available in the base zone, these carriers being driven back to the emitter by the reverse voltage. The reduction of the collector current is accelerated thereby.

Owing to the presence of the capacitor 19, the influence of the inductive load of the converter is compensated, so that the collector current does no longer lag in time relatively to the voltage across the winding 3. This voltage is furthermore substantially sinusoidal owing to the fly-wheel effect of the oscillating circuit 3—19, determining the operating frequency of the converter. The load current through the winding 12 is also substantially sinusoidal and, owing to the absence of any strong peak, the core of the winding 3 operates considerably further below the saturation point, so that the magnetic losses are small.

When feeding a luminescent tube, as shown in FIG. 1, the equivalent diagram of the transformer 3—12 is an inductor in series with the transformed load resistance, the value of the inductance being equal to the sum of the dispersion inductance of the transformer and of the transformed inductance of the control-inductor 16. In the arrangement shown in FIG. 3 the effective inductance of the winding 3 is thus formed partly by the transformed inductance of the control-inductor 16. If the dispersion-inductance of the transformer 3—12 is sufficiently high to ensure a satisfactory control of the discharge current in the luminescent tube 13, the control-inductor 16 may be omitted. This may be achieved, for example, by winding the transformer with the windings 3, 11 and 12 on a core provided with an air-gap.

The arrangement shown in FIG. 3 thus has the following advantages:

(1) The peak values of the collector- and base currents are much lower than with the known arrangements, particularly the arrangement shown in FIG. 1.

(2) The losses in the transistors are lower and the efficiency of the voltage converter is higher.

(3) Since neither the collector current nor the base current exhibit sharp, short peaks, the converter does not produce high-frequency interference voltages.

(4) The converter operates absolutely noiselessly.

When feeding a luminescent tube under the same conditions as with the converter shown in FIG. 1, a useful effect of 75% was attained, whereby a power of 16 w. was supplied to the luminescent tube. The light output of the 20 w. luminescent tube was 80% of the light output obtained when feeding it with 50 c./s. alternating voltage and with the nominal power of 20 w.

The current consumption of the voltage converter was 1.77 a. at a voltage of 12.05 v. The losses in each of the transistors were 1.75 w. The peak value of the collector current was only 2.1 a. and peak value of the base current was only 0.35 a. in loaded condition and 0.8 a. in unloaded condition. These values are below the published admissible values.

According to an obvious modification the base circuits of the transistors are designed as in the known arrangement of FIG. 1, the resistors 5 and 6 and the capacitors 17 and 18 being proportioned in accordance with the principle of the invention. The forward voltage fed to the base electrodes via the resistors 5 and 6 and the winding 4 (which may be omitted) may be varied at will by means of the potentiometer 8, 9. If this forward voltage is too low, or even equal to zero, difficulties may arise, under certain conditions, as regards the starting of the operation.

Figure 5:
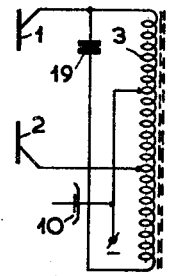

According to a further modification shown in FIG. 5, the collector winding 3 constitutes an auto-transformer, so that the alternating voltage effective between the collector electrodes is stepped up. The capacitor 19 is, however, connected across the whole of the winding 3, so that its capacity can be materially reduced. The winding 3 could, of course, be designed to be symmetrical.

Figure 6:
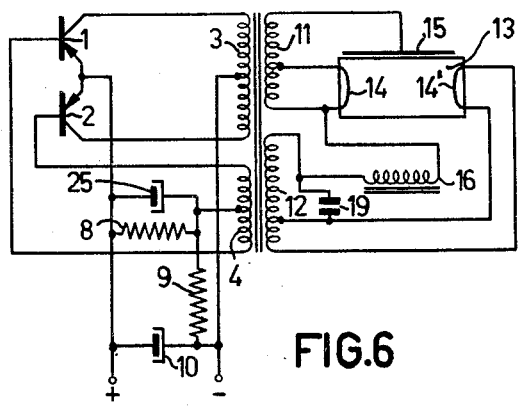
FIG. 6 shows a second embodiment of the converter according to the invention.

The second embodiment shown in FIG. 6 is distinguished from that of FIG. 3 in that the capacitor 19 of, for example, 0.039 μf., is not connected between the collectors of the transistors 1 and 2 but across the secondary winding 12, and in that the R.C.-networks 21, 23 and 22, 24 are replaced by a single R.C. network connected between a central tapping on a feedback winding 4 and the emitters and the positive terminal of the voltage supply source. The ends of the feedback winding 4 are connected to the bases of the transistors 1 and 2 and the central tapping of the winding is connected, through a starting resistor 9, to the negative terminal of the voltage source. The resistor 9 has a high value of, for example 4700 ohms and through this resistor a small forward current, which promotes the starting of the converter, is supplied to the bases. The resistor 8 has a small value of, for example, 100 ohms and the capacitor 25 has a capacitance of, for example, 0.56 μf., while the capacitor 10, which bridges the voltage supply source, has a comparatively high capacitance value of, for example 5 μf. The winding 4 has a small resistance and the value of the resistance 8 is at least 10 times greater and preferably at least 30 times greater than the sum of the remaining operative resistances of the base-emitter circuit of each of the transistors 1 and 2, measured in the forward direction. The sum of these remaining resistances is approximately equal to the resistance of one half of the winding 4 increased by the base-emitter resistance of the corresponding transistor 1 or 2 measured in the forward direction.

At the instant of switching a sinusoidal feed-back voltage is applied to the R.C.-element 8, 25 via the base-emitter path of the transistor which is controlled in the forward direction and the low resistance of one half of the feed-back winding 4. In the stable state the base current thus occurring would lead in time with respect to the said voltage by an angle φ, whereby $$\tan \phi = R_8 C_{25} \text{ and } \omega = 2\pi \times \text{the operating frequency } f$$

Since the base current must start with a value zero, a compensation current which decreases exponentially with the of the base-emitter resistance in the forward direction and of the resistance of one half of the winding 4. The result is a base-current pulse having a width slightly more than one quarter of a period which then continues in the opposite direction due to collection of free charge carriers from the base zone.

At a low value of dissipation resistance r, the voltage of the R.C.-element varies approximately like the feed-back voltage up to the peak value thereof. As soon as the feed-back voltage decreases, the capacitor voltage remains higher than the feed-back voltage: the said voltage decreases exponentially with the time constant $R_8C_{25}$. From this instant onward, the difference between the feed-back voltage and the capacitor voltage produces a reverse base current, so that the free charge carriers are removed from the base zone. Thus also the collector current is interrupted, so that the switching over to the other transistor takes place when the first transistor has no current: the switching losses are thus strongly reduced.

In order to ensure these essential advantages with respect to the switching action and the overall efficiency of the converter, the loss-resistance $r$ of the base circuit of each transistor must be as low as possible, i.e. at least one order of magnitude, preferably at least 30 times lower than the resistor $R_8$ of the R.C.-element. The impedance of the capacitor 25 of the R.C.-element at the operating frequency is lower than the value of the resistance $R_8$, preferably even at least twice as low as this value. By this proportioning, an advantageous pulsatory course or shape of the base current and the desired time-leading of the base current pulses are ensured.

In order to minimize the resistance value $r$, it has been found to be advantageous, as stated above, to use a separate feed-back winding instead of a direct cross-wise coupling of the base electrodes with the collector electrodes via separate R.C.-elements. The feedback winding 4 may have fewer turns than the collector winding, so that the resistance thereof may be correspondingly lower. Moreover, a single R.C.-element will suffice, so that a capacitor and a resistor are economized.

The capacitor 25 is charged twice in one period, whereas the capacitors of separate R.C.-elements are charged once in a period. In principle, the time constant of the R.C.-element 8, 25 could therefore be chosen to be twice as small as the time constant of the separate R.C.-elements. In practice, however, these time constants are not much higher or even smaller than half a period of the operating frequency, so that the most advantageous values for the two circuits do not differ materially.

With a luminescent tube or a similar gas discharge device as a load, due to the increase in tube voltage at a decrease in the tube current, the operating frequency decreases comparatively strongly, with the supply voltage, so that prevailing favourable operating conditions are soon no longer fulfilled and the output of the converter decreases. This disadvantage can be obviated to the major part by chosing the zero-load output voltage higher, preferably at least three times higher than the operating voltage of the device. This output voltage is then sufficient for igniting the device without the need for particular expedients conventionally employed, such as starters and the like. During operation, a large part of the output voltage is dropped across the control-inductor, so that an increase of operating voltage of the device with decreasing in output voltage produced only a materially small decrease of the inductive load to be compensated by the capacitor 19 and hence only a slight decrease of the operating frequency. Moreover, the favourable adjustment of the R.C.-element with respect to the operational frequency thus remains substantially unchanged.

A converter intended for a supply voltage of 26 v., loaded with a luminescent tube of 210 v./20 w. operated satisfactorily with supply voltages of 15 to 30 v. With an increase of supply voltage from 20 to 30 v., the efficiency decreased from 83% to 79.5%, whereas the operating frequency increased from 7200 to 8200 c./s. With a lower zero-load voltage, the efficiency dropped from 83% to 75%, whereas the operating frequency increased from 5400 c./s. to 10,300 c./s. The converter still operated satisfactorily with a supply voltage of 16 v.

When using a common R.C. network 8, 25 as shown in FIG. 6, one capacitor and one resistor can be dispensed with. However, the converter becomes more critical with respect to the characteristic parameters of the transistors used and, since the working point of each of the transistors and the feedback of each transistor through the transformer and through the capacitor cannot be adjusted individually, the transistors cannot be interchanged as readily as in the circuit arrangement of FIG. 3.

Figure 7:
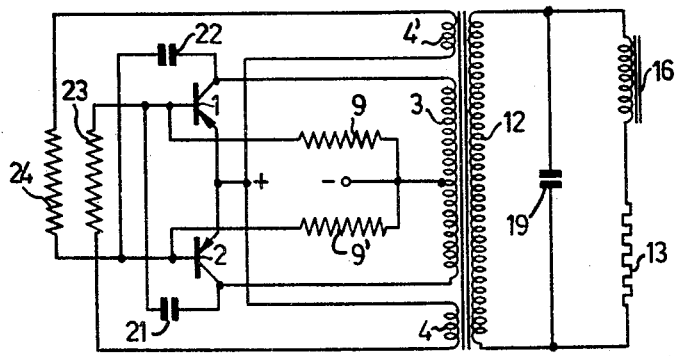
FIG. 7 shows the circuit diagram of a third embodiment.

The voltage converter of FIG. 7 offers more possibilities with respect to the independent adjustment of the working point of each of the transistors, of the feedback by means of feedback windings 4 and 4' and of the additional feedback for the abruptly cutting off of the transistors by means of the capacitors 21 and 22. As will be seen from the figure the base of each of the transistors 1 and 2 is coupled with the collector of the other transistor through a resistor 23 and 24 respectively and through one of the feedback windings 4 and 4', and connected, with respect to direct current, to the positive terminal of the supply source. The base of each of the transistors is also coupled to the collector of the other transistor through the capacitor 21 or 22 respectively, and finally it is connected to the negative terminal of the supply source through a starting resistor 9 or 9' respectively.

By a suitable choice of the feedback voltage induced in the windings 4 and 4', the losses in the resistors 23 and 24 and/or 9 and 9' can be materially reduced. However, the instant at which each transistor is cut-off is still highly dependent upon the load and especially upon the instantaneous value of the base-collector current amplification factor $\alpha'$ of this transistor, so that the interchangeability of the transistors, without adjustment of the resistors and, as the case may be, of the capacitors 21 and 22, is still comparatively poor. Furthermore, at the instant at which a transistor is cut-off, a voltage of approximately twice the supply direct voltage is applied between its base and emitter through the capacitor 21 or 22 of its base circuit. Hence, a comparatively low supply voltage must be used.

Figure 8:
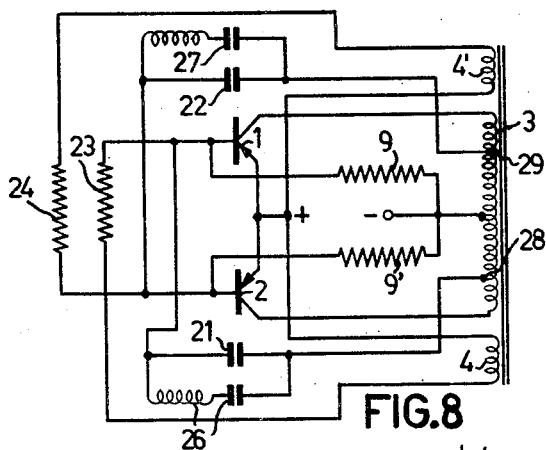
FIG. 8 is the circuit diagram of a fourth embodiment.

FIG. 8 shows the circuit diagram of a fourth embodiment of the voltage converter in accordance with the invention. This embodiment differs from that of FIG. 7 in that each of the capacitors 21 and 22 is bridged by a series resonant circuit having a natural frequency exceeding the working frequency of the converter. As a result, the efficiency of the feedback circuit through the capacitor is greatly increased with respect to the sharp and peaked cut-off pulse, so that the interchangeability of the transistors is much improved and the capacitor shunted by the series resonant circuit can, with better success, be connected between the base of one of the transistors and a tapping on the winding 3 instead of between said base and the collector of the other transistor. Obviously, the maximum base-emitter voltage is decreased correspondingly, so that the voltage of the supply source can be chosen higher. As will be seen from the figure, the capacitor 21 or 22 respectively is shunted by a series resonant circuit 26 or 27 respectively and connected at one end to a tapping 28 or 29 respectively on the winding 3.

Figure 9:
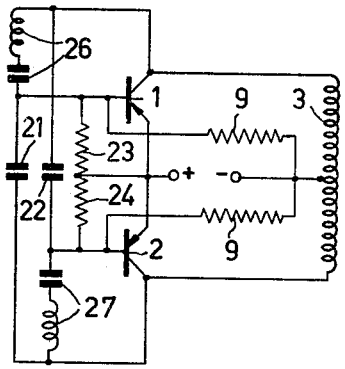
FIG. 9 shows a fifth embodiment.

FIG. 9 shows a fifth embodiment of the voltage converter in accordance with the invention. This embodiment differs from that of FIG. 8 in that the series resonant circuits 26 and 27 are not connected in parallel with the capacitors 21 and 22 respectively but between the base of each of the transistors 1 and 2 and the collector of the same transistor. Furthermore, the feedback windings 4 and 4' can be dispensed with and the base resistors 22 and 24 are directly connected to the positive terminal of the supply source. The capacitors 21 and 22 are connected between the base of one of the transistors 1 and 2 respectively and the collector of the other of these transistors.

Figure 11:
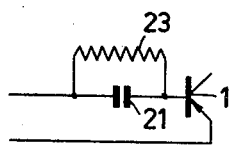
FIG. 11 shows current-time-diagrams illustrating the operation of the voltage converters according to various figures.
Figure 11:
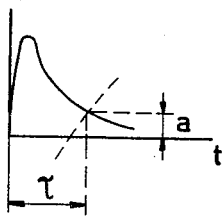
Figure 11:
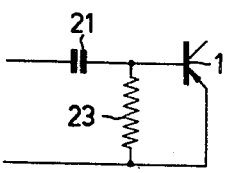
Figure 11:
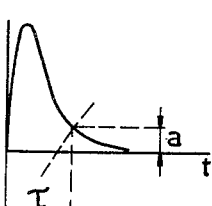
Figure 11:
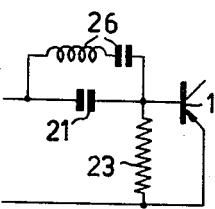
Figure 11:
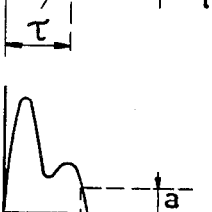
Figure 11:
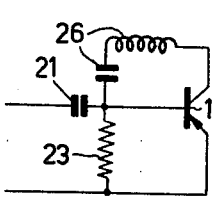
Figure 11:
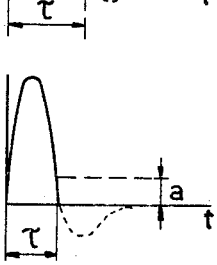

The operations of the various voltage converters described can best be compared to each other with reference to the current-time diagrams of FIG. 11. To the left of the upper current-time diagram of FIG. 11, the base circuit of one of the transistors of the voltage converter of FIG. 3 or of FIG. 6 is shown. To the right thereof, the current-time diagram shows the variation of the base current of the transistor during the half-cycle in which this transistor is conductive. As will be seen from the figure, this base current initially shows a steep and sharp pulse and then decreases comparatively slowly and does not disappear altogether. Until the end of the half-cycle of conductivity, a base current continues to flow through the resistor 23 or 24 (FIG. 3) or 8 (FIG. 6) and gives rise to rather considerable losses therein.

To the left of the second current-time diagram of FIG. 11, a fundamental diagram of the base circuit of the voltage converter according to FIG. 7 is shown. Owing to the fact that the base resistor of each of the transistors 1 and 2 is connected to the corresponding emitter through the winding 4 or 4' respectively, the base current falls to zero, initially steeply and then comparatively slowly. The direct current flowing through the base resistor 23 or 24 (including the direct current through the resistor 9 or 9' of FIG. 7) brings about somewhat smaller losses.

To the left of the third current-time diagram of FIG. 11, there is shown a base circuit which corresponds to that of the transistors 1 and 2 of the embodiment of FIG. 8. As will be seen from the third current-time diagram, due to the provision of the series resonant circuit, the base current undergoes a delayed boosting, whereupon it falls off very rapidly. The sum of the capacitances of the capacitor of the series resonant circuit 26 or 27 and of the feed-back capacitor 21 or 22 is less than the capacitance of the feed-back capacitor 21 or 22 in the voltage converter of FIG. 7, but the period $\tau$ during which the transistor 1 or 2 is conductive, is slightly longer.

Finally, the lowermost circuit diagram of FIG. 11 shows a base circuit corresponding to that of each of the transistors of the embodiment of FIG. 9. The lowermost current-time diagram of FIG. 11 shows that the base current of each of the transistors now assumes the shape of a pulse having a steep leading edge and a steep trailing edge, and that the base current very rapidly approaches a change-over value $a$ and zero value. Furthermore, the half-cycle of conductivity is comparatively short: due to the connection of the series resonant circuit between the base and the collector of the same transistor, the base current undergoes a delayed reduction to cut-off value as compared to that shown on the second current-time diagram of FIG. 11, and not a delayed boosting as is the case in the third current-time diagram. A comparison of the third and fourth current-time diagrams of FIG. 11 with the first two current-time diagrams of this figure clearly shows the favourable influence of the series resonant circuits in the base circuit of each of the switching transistors: in both cases, the change-over value $a$ and the zero value are quite suddenly reached, with a rapid decrease of the base current, and this is of advantage for switching over the transistors and causes the losses brought about by the delayed and/or slow decrease of the collector current to be materially reduced.

Figure 10:
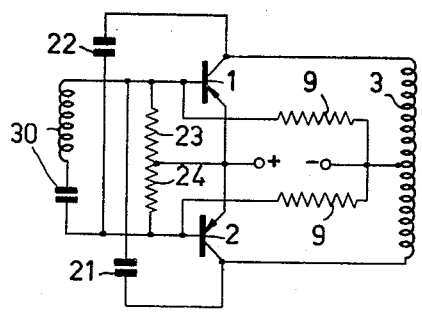
FIG. 10 shows a modification of the embodiment of FIG. 9.

FIG. 10 shows a modification of the embodiment shown in FIG. 9. In this modified embodiment, the two series resonant circuits 26 and 27 of FIG. 9 are replaced by a single series resonant circuit 30 connected between the bases of the two transistors. In the embodiments of FIGS. 9 and 10, the inductance of the series resonant circuit 30 or of each of the series resonant circuits 26 and 27 has a value about twice that of each of the series resonant circuits of the embodiment shown in FIG. 8. The operation and the properties of the embodiment of FIG. 10 are more or less the same as those of the embodiment of FIG. 9. However, owing to the common series resonant circuit 30, the adjustment is slightly more critical and the interchangeability of the transistors 1 and 2 is not quite as good. However, if transistor pairs or transistors having comparatively small tolerances are available, this arrangement saves two elements.

Both the embodiment of FIG. 9 and the modification of FIG. 10 can be operated with comparatively high values of the voltage of the supply source without the risk of a breakdown between base and emitter and/or between base and collector of one of the transistors 1 and 2. The combination of the feed-back capacitor 21 or 22 and of the corresponding series resonant circuit 26 or 27, or the combination of both feed-back capacitors 21 and 22 and of the series resonant circuit 30, effectively constitutes a voltage divider and in most cases there is no need for additional tappings on the winding 3, as the tappings 28 and 29 of FIG. 8.

Since, in particular in the embodiments of FIGS. 8 and 9 and in the modification of FIG. 10, each transistor is positively switched on by the sharp base pulses after the reversal of the load current and is positively switched off again before the reversal of this current, the interchangeability of the transistors is considerably improved and the converter is enabled to work with a highly satisfactory efficiency at a high frequency. Operation at a high working frequency again permits of reducing the transformer and the values of the coupling impedances 21, 22, 26 and 27 and of the impedances, such as 19 and 16 in FIGS. 6 and 7, connected in the load circuit, and hence of reducing the size and the price of the converter.

The voltage converters described above were designed for supplying voltage to luminescent tubes. However, they may, of course, also be employed for other purposes, for example, for supplying an electro-luminescent element or panel, in which the electrodes of the panel are connected directly or via a control-inductor as the inductor 16 of FIG. 6 or 7, to the ends of the winding 12 of FIG. 6 or 7. With the intermediate luminescent layer these electrodes constitute a capacity. The capacitor 19 of one of the FIGURES 3, 5 and 7, being omitted, this capacity together with the control-inductor 16 may constitute an oscillatory circuit which principally determines the operating frequency of the converter and which can be tuned to the desired operating frequency by means of the said control-inductor.

Obviously, many other modifications and variations are possible in the light of the above teachings. It is, therefore, to be understood that within the scope of the appended claims, the invention may be practiced other than as specifically described and illustrated. It is particularly pointed out that the quantitative values given for various circuit components are for illustrative purposes only and are not meant to limit the scope of the invention.

What is claimed is:

1. A voltage converter comprising two push-pull connected, alternately conductive transistors, a winding provided with a central tapping and connected between the collector electrodes of said transistors, the base- and collector-electrodes of the two transistors being cross-coupled, a first capacitor coupled with said winding and forming an oscillating circuit together with the inductance effective in the collector-circuits of the transistors, the natural frequency of the oscillating circuit determining the operating frequency of the converter and being of the same order as the $\alpha'$ limit frequency of the transistors, an R.C. member connected in the base-emitter circuit of each of the transistors, the impedance of the capacitor of said member at the operating frequency being lower than the value of the resistor so that the base current of each of the transistors leads with respect to its collector current, the collector current of each transistor being maintained after the blocking of the base-emitter path of the transistor due to an accumulation of free charge carriers in the base zone thereof, and being interrupted prior to the reversal of the collector voltage of the transistor by a reverse current pulse supplied to the base electrode of said transistor via the capacitor of the R.C. member.

2. A converter as claimed in claim 1, characterized in that the resistor of said R.C. member is of at least one order of magnitude and preferably of at least 30 times larger value than the sum of the other resistances effective in the forward direction in the base-emitter circuit of each of the transistors.

3. A converter as claimed in claim 1, wherein the base- and collector-electrodes of both transistors are cross-coupled via coupling-members consisting each of a series capacitor and of a resistor the impedance of the capacitor of each coupling-member at the operating frequency being at least $2\pi$ times smaller than the value of the resistor of each said coupling member.

4. A converter as claimed in claim 1 wherein said first capacitor is connected across said collector winding.

5. A converter as claimed in claim 1, for supplying alternating-current to a luminescent tube, wherein the inductance effective at the terminals of said collector winding is at least partly produced by a control-inductor connected in series with the luminescent tube.

6. A converter as claimed in claim 5, further comprising an output transformer the primary winding of which is formed by the said collector winding, said control-inductance being formed by the dispersion inductance of said transformer.

7. A converter as claimed in claim 5 wherein said first capacitor and the inductance effective at the terminals of the collector winding cause the occurrence of a second harmonic of the operating frequency of the converter which lies substantially beyond the range of audible frequencies.

8. A converter as claimed in claim 5, wherein the effective no-load output voltage of the converter is at least three times higher than the effective discharge-voltage of the luminescent tube, whereby the reactive component of the current through the control-inductance and the discharge path of the luminescent tube is large with respect to its real component and the operating frequency of the converter, its efficiency and the light output of the luminescent tube remain comparatively constant with varying D.C. supply-voltage.

9. A converter as claimed in claim 1 wherein a series resonant circuit having a natural frequency higher than the operating-frequency of the converter is connected between the base of each of the transistors and another point of the converter so that said circuit increases the steepness of the slope of the leading edge and/or the trailing edge of the base current pulse and promotes a free decay of the load circuit after one transistor has been cut-off and the other transistor has been rendered conductive.

10. A converter as claimed in claim 9, in which the resistor of the R.C. network of each of the transistors is connected to its emitter through a feed-back winding the series resonant circuit being connected in parallel with the capacitor of said R.C. network, whereby a delayed forward current pulse followed by a sharp reverse pulse is supplied to the base of the transistor through the series resonant circuit.

11. A converter as claimed in claim 9, in which the resistor of the R.C. network of each of the transistors is connected to its emitter through an additional feed-back winding the series resonant circuit being connected between the base of the transistor and a point of its collector circuit whereby a delayed reverse pulse is supplied to the base of this transistor through the series resonant circuit.

12. A converter as claimed in claim 11, wherein a common series resonant circuit is connected between the bases of the two transistors and, in series with the capacitor of the corresponding R.C. networks between two corresponding points of the collector circuits of the two transistors.

13. A converter as claimed in claim 9 the capacitor of the R.C. network of each of the transistors being connected between the base of the corresponding transistor and a tapping on the said collector winding said tapping being connected between the said centre tapping and the collector of the other transistor.

References Cited in the file of this patent

UNITED STATES PATENTS

| | | |
|---|---|---|
| 2,016,790 | Perlman | Oct. 16, 1935 |
| 2,759,104 | Skellet | Aug. 14, 1956 |
| 2,872,582 | Norton | Feb. 3, 1959 |
| 2,883,539 | Bruck et al. | Apr. 21, 1959 |
| 2,895,081 | Crownover et al. | July 14, 1959 |